US007369476B2

(12) United States Patent
Kravtchenko et al.

(10) Patent No.: US 7,369,476 B2
(45) Date of Patent: May 6, 2008

(54) DEVICE FOR READING FROM OR WRITING TO OPTICAL RECORDING MEDIA HAVING A CONTROL UNIT FOR A DATA SLICER

(75) Inventors: Alexander Kravtchenko, Villingen-Schwenningen (DE); Marten Kabutz, Villingen-Schwenningen (DE); Bruno Peytavin, Grenoble (FR)

(73) Assignee: Thomson Licensing, Boulogne Billancourt (FR)

( * ) Notice: Subject to any disclaimer, the term of this patent is extended or adjusted under 35 U.S.C. 154(b) by 855 days.

(21) Appl. No.: 09/739,601

(22) Filed: Dec. 18, 2000

(65) Prior Publication Data

US 2001/0017834 A1 Aug. 30, 2001

(30) Foreign Application Priority Data

Dec. 20, 1999 (DE) ................ 199 61 440

(51) Int. Cl.
G11B 7/00 (2006.01)
(52) U.S. Cl. ................................. 369/59.17
(58) Field of Classification Search ............ 369/59.17, 369/124.08, 124.14, 59.19, 44.32, 44.34, 369/47.35, 109.01; 375/244, 242; 360/40, 360/65

See application file for complete search history.

(56) References Cited

U.S. PATENT DOCUMENTS

| 4,628,497 | A | 12/1986 | Bierhoff ............ 369/44.32 |
| 5,359,585 | A | 10/1994 | Tanoue et al. ........ 369/47.35 |
| 5,568,465 | A * | 10/1996 | Hutchins et al. ...... 369/59.15 |

(Continued)

FOREIGN PATENT DOCUMENTS

| EP | 0051343 A2 | 5/1982 |
| EP | 0653753 A2 | 5/1995 |

OTHER PUBLICATIONS

Translation of the previously submitted Austrian Search Report.
Translation of the previously submitted German Search Report.

*Primary Examiner*—William Korzuch
*Assistant Examiner*—Joseph Haley
(74) *Attorney, Agent, or Firm*—Joseph J. Laks; Harvey D. Fried; Patricia Verlangieri (57) ABSTRACT

The present invention relates to a device for reading from and/or writing to optical recording media (1) having an optical scanner (2) for scanning the recording medium (1) by means of a light beam (3) and for generating scanning signals (HF) from the reflected beam (3), a data slicer (5) for converting a scanning signal (HF) output by the optical scanner (2) into a binary signal (HF"), an averaging unit (6) for forming an average value (M) from the scanning signal (HF, HF") as input signal of the data slicer (5), and a control unit (14) for changing a parameter (T, OF) of the averaging unit (6). The object of the present invention is to propose a device of this type and also a suitable method therefor in which the average value (M) can be adapted to disturbances during the scanning of the recording medium. According to the invention, this is achieved by virtue of the fact that the control unit (14) has a unit (8, 10) for outputting a comparison value (S, HFN) and a comparator (7, 11) for comparing the average value (M) with this comparison value (S, HFN), and triggers a chance in the parameter (T, OF) in the event of the comparison value exceeded or undershot.

7 Claims, 4 Drawing Sheets

U.S. PATENT DOCUMENTS

| | | |
|---|---|---|
| 5,680,380 A | 10/1997 | Taguchi et al. .......... 369/47.35 |
| 5,784,356 A * | 7/1998 | Hayashi et al. .......... 369/47.25 |
| 5,847,891 A | 12/1998 | Ohmori et al. ............... 360/40 |
| 5,974,088 A | 10/1999 | Chang ........................ 375/244 |
| 6,289,057 B1 * | 9/2001 | Velez et al. ................. 375/317 |
| 6,765,855 B1 * | 7/2004 | Adachi et al. ........... 369/59.17 |

* cited by examiner

DEVICE FOR READING FROM OR WRITING TO OPTICAL RECORDING MEDIA HAVING A CONTROL UNIT FOR A DATA SLICER

FIELD OF THE INVENTION

The present invention relates to a device for reading from and/or writing to optical recording media which has an optical scanner whose output signal is converted into a shaped signal, also called binary signal or square-wave signal, by means of a data slicer before the data are decoded.

BACKGROUND OF THE INVENTION

A device of this type is disclosed in EP-A-800 163. In this device, an average value is formed from the scanning signal and serves as input signal of the data slicer. A control unit serves to change the time constant for the averaging process when a great change occurs in the analogue scanning signal, caused by boundaries of different areas of data tracks on the recording medium. The known device may be regarded as having the disadvantage that although an adaptation of the average value in the case of a transition from one type of data area to another takes place more rapidly than without a change in the time constant, an adaptation of the average value is nonetheless restricted to this type of transition.

SUMMARY OF THE INVENTION

An object of the present invention is to propose a device and also a suitable method in which the average value can also be adapted to disturbances during the scanning of the recording medium.

This and other objects are achieved by means of the measures specified in the claims.

To that end, the invention provides for the control unit to have a unit for outputting a comparison value and also a comparator for comparing the average value with the said comparison value and for a change in a parameter of the averaging unit to be triggered in the event of the comparison value being exceeded or undershot. This has the advantage that it is not necessary to evaluate the reproduced signal which must first be formed from the binary signal output by the data slicer. The evaluation of a signal, the average value, which is already available in a significantly earlier processing stage results in a faster reaction of the system and is not restricted to a specific type of disturbance, such as, for example the transition from one type of data area to another. The comparison of the average value with suitably chosen comparison values enables detection of and reaction to different types of disturbances. The scanning signal output by the scanner is an analogue, continuously changing signal which is converted into a shaped, binary signal by the data slicer using the average value. In this case, the data slicer compares the scanning signal with the average value. If the value of the scanning signal is greater than the average value, then the binary signal assumes a "high" value, otherwise it assumes a "low" value.

One variant of the invention provides for a threshold value to be fixedly predetermined as the comparison value and for the changed parameter to be a time constant of the averaging unit. The latter is reduced if the average value falls below the threshold value, and it is increased if the average value exceeds the threshold value. If the average value remains above or below the threshold value, then the time constant remains unchanged. One advantage of this variant resides in the fact that non-readable data, caused by so-called black dots, finger prints or other similar disturbances which reduce the amplitude of the output signal, are detected. The time constant is reduced in such a case, as a result of which the average value is adapted more rapidly than in the case of the normal, higher time constant which is suitable for the customary read-out operation. Although faster adaptation of the average value generally results in an increase in the error rate in the reproduced signal, it is the case that when there is a major decrease in the average value, caused by a black dot, finger print or the like, data can no longer be correctly reproduced in any case above a specific intensity. With the device according to the invention, however, it is virtually always possible to form a correct average value which then also enables fast, correct identification of data at the end of the disturbance. Existing error correction mechanisms can then already carry out a correct data reproduction from a binary signal that still partly contains errors at a significantly earlier time than is possible in conventional devices, which first have to find a correct average value again over a prolonged period at the end of a disturbance which is manifested in the amplitude of the output signal. It is advantageous for a plurality of threshold values to be provided, which enable the time constant to be changed in a gradated manner depending on the magnitude of the dip in the amplitude of the output signal. Such a co-ordinated change makes it possible for reading still to be effected without errors in the event of only slight disturbances and for a departure to be made from this compromise only in the event of a major dip.

The invention furthermore provides for the unit for outputting a comparison value to be an extrapolation unit for determining an extrapolated zero crossing of the scanning signal and, as comparison signal, to output the value of the scanning signal at the extrapolated zero crossing, the comparator triggering a change in an offset value for the average value if there is a difference between comparison value average value. This has the advantage that, in this way, it is also possible to compensate an offset in the scanning signal which is caused for example by erroneously excessively large or excessively small pit data markings of the recording medium, so-called overetching or underetching.

It is advantageous for a repeat check unit to be arranged downstream of the comparator, which unit forwards a corresponding output signal only in the event of multiply successive unidirectional input signals. This has the advantage that there is no immediate reaction to erroneous deviations which are simulated on account of other disturbances, rather there is a reaction only when multiple repetitions of unidirectional signals confirm the actual presence of a change requirement. This also avoids the situation where continuously opposite changes are performed, which may be the case for example in the case of an average value which fluctuates slightly by a constant value.

The invention provides for an analogue-to-digital converter to be arranged downstream of the optical scanner. This has the advantage that all the downstream elements of the device operate on a digital basis and can thus be produced cost-effectively and flexibly. A further advantage resides in the fact that digital components can react more rapidly to parameter changes than analogue components, thereby enabling faster adaptation of the average value.

A method according to the invention for forming an average value for a data slicer of a device for reading run-length-coded data consists in integrating an input signal with a specific time constant, low-pass filtering the integrated signal and both outputting the low-pass-filtered signal as average value and checking it using a threshold value. If the value of the low-pass-filtered signal lies above the threshold value, then a first time constant is set or maintained; if the value lies below the said threshold value, then a second time constant for the integration is set or maintained. These steps are carried out for each clock cycle or at other, regular intervals. This has the advantage of thereby achieving fast adaptation of the integrator in the case of a major decrease in the average value below, or a major increase above, the threshold value. In this way, an optimum value is always obtained for the average value, which is fed to the data slicer as input signal.

The invention provides for the check to be carried out using a plurality of threshold values and for different time constants to be provided depending on the threshold values between which the low-pass-filtered signal is situated. This has the advantage of enabling more adapted reaction to changes in the value of the low-pass-filtered signal, that is to say the average value. In the event of only a slight decrease in which data can still be reproduced, only slightly faster adaptation of the average value is carried out in order that the error rate of the reproduced data is still kept relatively low. In this case, under certain circumstances, it is even possible for an error-free data signal to be reproduced depending on the quality of the correction method and depending on other influences. In the event of a larger decrease, a higher error rate is accepted in order nevertheless to be able to form a correct average value for the slicer. Even in the case of such an increased error rate, in most cases it is still possible at least occasionally to identify specific data correctly and thus still to maintain specific functions of the device, which would no longer be possible without the presence of a correct average value. By way of example, certain control information, data indicating location or time, or the like can thus still be identified.

It is advantageous for a corrected low-pass-filtered signal to be output as the average value. This has the advantage of enabling additional correction of the average value which does not appear in the decrease in the average value below the threshold value. This increases the quality of the data reproduction.

It is advantageous to add an offset value for the correction of the low-pass-filtered signal. This has the advantage of enabling compensation for example of an offset caused by the production of the recording medium.

A further method according to the invention consists in determining a probable zero crossing point of an output signal, and also the value of the output signal at this zero crossing, this value being compared with the average value and the average value being increased in the event of a positive deviation and decreased in the event of a negative deviation, while the average value is maintained if no deviation occurs. This has the advantage of enabling correction of an offset due to a deviation of the lengths of the data markings of the recording medium, for example caused by faults during production.

In this case, it is advantageous for the values of the output signal for at least two successive zero crossings to be compared with the average value and for a change to be made to the average value only when all or at least most of the deviations are unidirectional. This has the advantage of avoiding errors caused by outliers or by fluctuations by an essentially constant value. It has proved to be particularly advantageous to assess two successive zero crossings and to perform a change only when both deviations are positive or both are negative. Only in the case of higher numbers of values considered is it expedient to permit a small number of deviations, for example of the order of magnitude of 10% to 15%.

It is advantageous for the changes in the time constants and the changes in the offset value to be carried out simultaneously or successively, essentially in parallel with one another. This has the advantage that the advantages of the respective variants are combined.

The invention furthermore provides for the input signal firstly to be subjected to analogue-to-digital conversion and for the subsequent steps to be performed on a digital basis. This has the advantage that the entire method is carried out on a digital basis. Changing the parameters on a digital basis is simple and can be carried out more rapidly than is the case on an analogue basis. Overall, a faster adaptation of the average value and a lower error rate in the binary signal and thus in the reproduced data are consequently achieved.

Further advantages of the invention are specified in the following description of an exemplary embodiment. It is understood that further combinations—not expressly specified here—of features according to the invention and also developments and refinements that are within the abilities of a person skilled in the art also likewise lie within the scope of the invention.

DETAILED DESCRIPTION OF PREFERRED EMBODIMENTS

Figure 1:
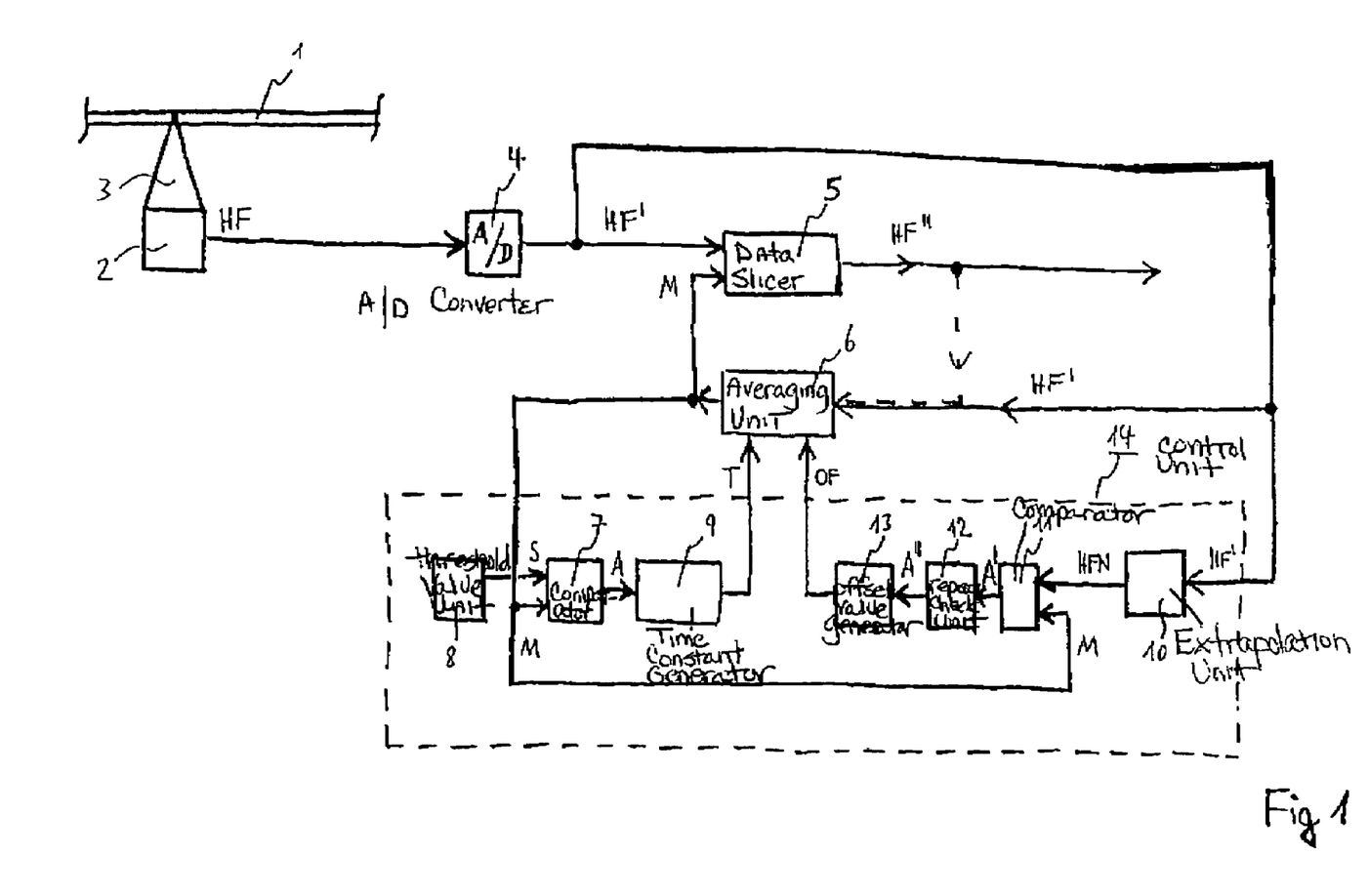
FIG. 1 shows a schematic illustration of a device according to the invention.

FIG. 1 schematically illustrates elements of a device according to the invention, the said elements being essential to the invention. An optical recording medium 1, for example a CD or a DVD, is scanned by the optical scanner 2 by means of a scanning beam 3. The light reflected from the recording medium 1 is detected in a known manner and converted into one or more analogue electrical signals. An electrical output signal HF is indicated here in a simplified manner, which output signal is forwarded to an analogue-to-digital converter 4 by the optical scanner 2. The digitized output signal HF' is fed to a data slicer 5. An average value M is present at a second input of the data slicer 5. The data slicer 5 outputs a shaped output signal HF", which assumes a "high" value if the digitized output signal HF' assumes a value greater than the average value M, and which assumes a "low" value if the value of the digitized output signal HF' is less than the average value M.

The shaped output signal HF", which is also referred to as a binary signal or square-wave signal, is, on the one hand, forwarded to an evaluation unit (not illustrated) which recovers from it the data recorded in code form on the optical recording medium 1. On the other hand, in accordance with one variant, the shaped output signal HF" is fed to an averaging unit 6. This is illustrated by broken lines.

However, the input signal of the averaging unit 6 is preferably the digitized output signal HF'. In accordance with one variant of the invention, however, the use of the shaped output signal HF" is possible here as well. The averaging unit 6 forms a time average value M of its input signal. The average value M is fed to the data slicer 5, on the one hand, and to a comparator 7, on the other hand.

A threshold value S output by a unit 8 is fed to the comparator 7 as comparison value. The unit 8 is designed as a memory which forwards one or more threshold values S to the comparator 7. Depending on which of the ranges of values defined by the one or more threshold values S is the range of values in which the average value M is situated, the comparator 7 outputs a trigger signal A to a time constant generator 9. The latter outputs a time constant T to the averaging unit 6 in a manner dependent on the trigger signal A.

The digitized output signal HF' is furthermore fed to an extrapolation unit 10, which determines from this signal the probable position of a zero crossing of the signal and also the value of the digital output signal HF' at this zero crossing. This value HFN is fed to a comparator 11. By way of example, the extrapolation unit 10 carries out a linear or higher extrapolation of the individual digitized values of the digitized output signal HF' and determines a point of inflection of the signal which is digitized in this way. This point of inflection should correspond approximately to the zero crossing point. Another possibility for determining the probable zero crossing point is to use a so-called maximum likelihood detector. Such detectors are known to the person skilled in the art and are not, therefore, described in greater detail here.

The comparator 11 compares the value HFN of the output signal at the zero crossing with the average value M and outputs a trigger signal A' if a deviation is present. The trigger signal A' is fed to a repeat check unit 12, which assesses two or more successive trigger signals A' to the effect of whether or not they have the same sign. If they have the same sign, that is to say if they are consistent, then the repeat check unit 12 outputs a trigger signal A" to an offset value generator 13. The latter generates from the trigger signal A" an offset value OF, which is fed to the averaging unit 6.

The averaging unit 6 forms the average value M as a function of the parameters time constant T and offset value OF which are fed to it by the control unit 14, which has the elements 7 to 13 described above. As a function of the time constant T, the averaging unit 6 reacts more or less sluggishly to changes in its input signal HF". As a function of the offset value OF, the initially determined average value is additionally corrected by the offset value before it is output as average value M. The path of the control unit 14 which is formed from the elements 7 to 9 and the path which is formed from the elements 10 to 13 also constitute a solution according to the invention independently of the respective other path. Both solutions are represented here in combination.

Figure 2:
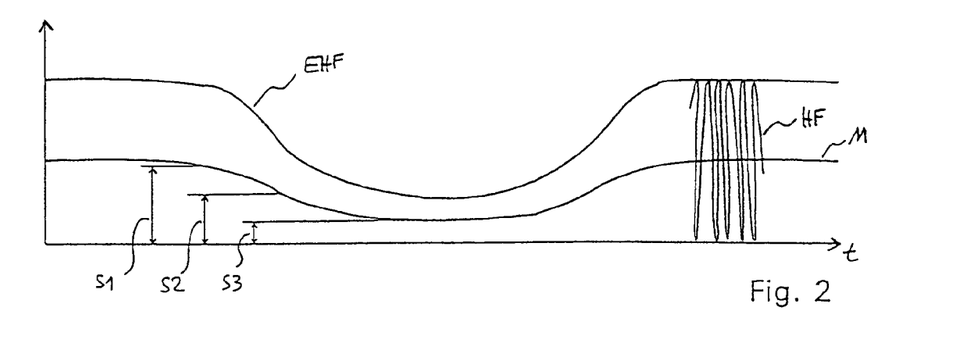
FIG. 2 shows a schematic profile of output signal and average value.

FIG. 2 schematically shows the profile of output signal HF and average value M. In this case, the time t is plotted on the horizontal axis, while the amplitude of the respective signals is plotted on the vertical axis. The high-frequency output signal HF is indicated in the right-hand part of FIG. 2. This representation is not to scale. Only the upper envelope EHF of the output signal HF is depicted in most of FIG. 2. It can be seen that the average value M lies approximately at half the height of the upper envelope EHF. In the extreme left-hand part and in the extreme right-hand part of FIG. 2, the average value M lies above a first threshold value S1. In this area, data are detected without difficulty from the shaped output signal HF". In this area, the averaging unit 6 is operated with a time constant T1. If the envelope EHF decreases, then the average value M also decreases. If the average value M lies between the first threshold value S1 and a second threshold value S2, then the averaging unit 6 is operated with a smaller time constant T2. The same applies correspondingly to the ranges of values between the second threshold value S2 and the third threshold value S3 and, below S3, to the time constants T3 and T4. The average value of the output signal HF increases again at the end of the disturbance, for example the finger print or other contaminations of the surface of the recording medium. On account of the small time constant T4, T3 or T2, that is to say the low inertia of the averaging unit 6, the average value M follows the rise in the actual average value present virtually without any delay. In the area of this rise, it is now already possible to read first data correctly since the error rate is so low that the error correction of the evaluation unit (not illustrated) can compensate the errors that still occur. The resumption of the data reproduction already takes place at an earlier point in time with a device according to the invention than with a device according to the prior art.

Figure 3:
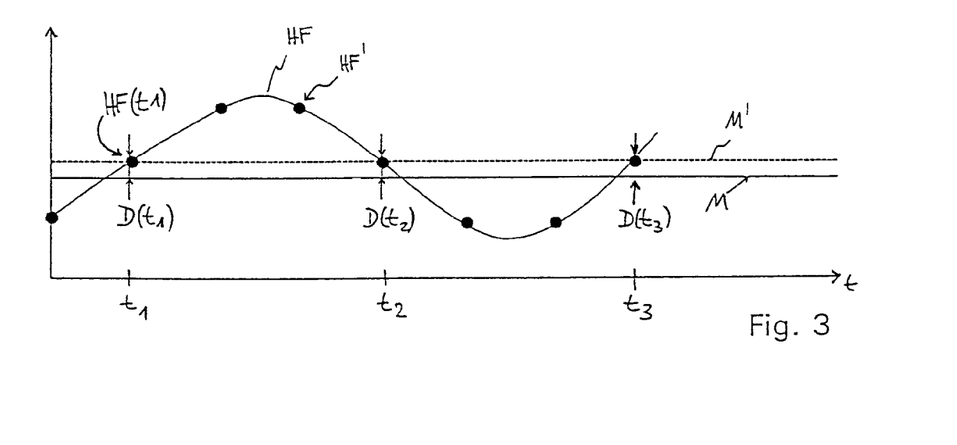
FIG. 3 shows the profile of output signal and average value in the case of a positive offset.

FIG. 3 shows the profile of output signal HF and average value M with great temporal dilation compared with FIG. 2. For the sake of simplicity, the average value M is depicted at being constant in the detail illustrated. The actual average value M' of the output signal HF is depicted by a broken line. The individual values of the digitized output signal HF' are depicted as points, and the analogue output signal HF as a solid line. It can be seen that there are about three to four sampling interpolation points of the digitized output signal HF' per half-cycle of the output signal HF illustrated. One of the shortest half-cycles occurring in the output signal HF is indicated here, a so-called 3-T signal. Longer half-cycles also occur in reality, for which half-cycles there are then correspondingly more interpolation points. On average, then, there is about one interpolation point of the digitized output signal HF' per 1T of the clock cycle with which data markings are recorded on the recording medium. In this case, in reality the longer half-cycles deviate from a sine-like form more greatly than those illustrated; they have a longer flattened region between the rising and falling edges, which have an approximately similar profile for all lengths.

The extrapolation unit 10 is used to determine the instant t1, t2, t3 of a zero crossing or the most probable instant therefor. The difference D(t1) between the average value M and the value HF(t1) of the output signal HF at the instant t1 of the zero crossing is determined and fed as trigger signal A1 to the repeat check unit 12. The latter checks whether the next correspondingly formed difference D(t2) also has the same sign as the difference D(t1). If this is the case, then the average value M has an offset with respect to the actual average value M'. As trigger signal A", the differences D(t1) and D(t2), for example, are fed to the offset value generator 13, which forms an average value, for example, from them and feeds it as offset value OF to the averaging unit. With the next difference D(t3), the next group of two to be checked by the repeat check unit 12 begins.

Figure 4:
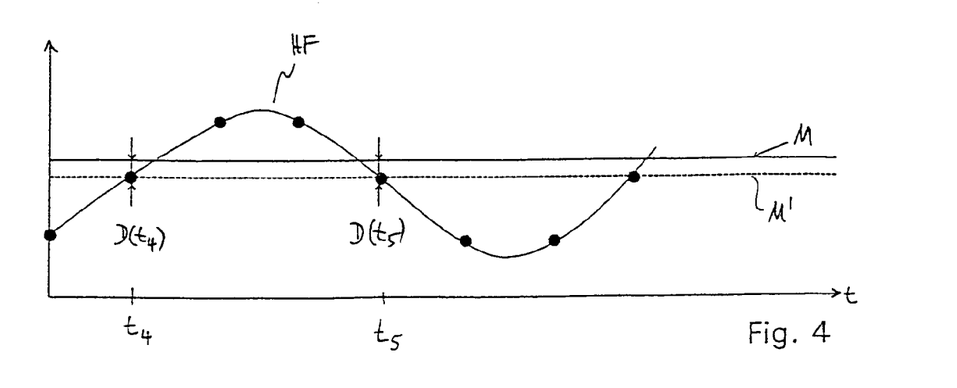
FIG. 4 shows the profile of output signal and average value in the case of a negative offset.

FIG. 4 shows the profile of output signal HF, average value M and actual average value M' in accordance with FIG. 3, but with an inverted offset OF. The differences D(t4) and D(t5) at the instants t4 and t5 of the zero crossings are each negative in this case. The offset value OF is thus formed with an inverted sign.

Figure 5:
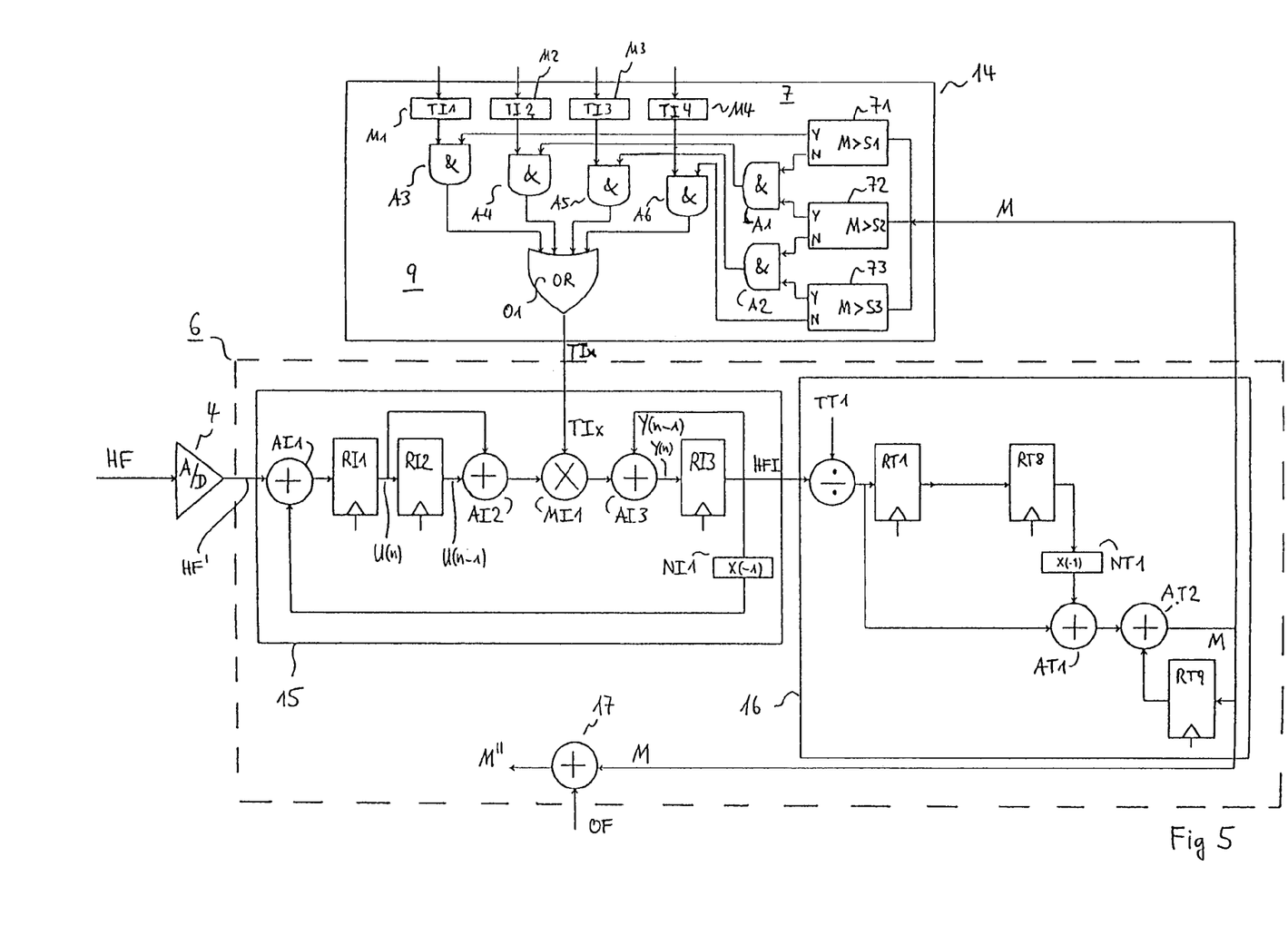
FIG. 5 shows an averaging unit of a device according to the invention.

FIG. 5 shows an averaging unit 6 of a device according to the invention. The output signal HF passes through the analogue-to-digital converter 4 and is fed to an integrator 15. A factor TIx corresponding to the time constant Tx is fed as a parameter to the said integrator. A short time constant Tx means that the integrator reacts rapidly, and a long time constant Tx means that it reacts sluggishly. Accordingly, TIx assumes a small value in the case of a long time constant and a large value in the case of a short time constant. The output signal of the integrator 15 is the integrated output signal HFI, which is fed to a low-pass filter 16. The latter's output signal, the average value M, is fed to the control unit 14, which is partly illustrated here, and also to an adder 17, at whose other input the offset value OF is present and whose output signal is the corrected average value M".

The integrator 15 has three registers RI1, RI2, RI3, three adders AI1, AI2, AI3, a multiplier MI1 and an inverter NI1. The integrator 15 performs the integration of the digitized output signal HF' by means of a numerical method, the so-called trapezoidal method. In this case, the following holds true for the value Y(n), the value stored in the register RI3: $Y(n)=Y(n-1)+TIx*(U(n)+U(n-1))$. In this case, Y(n-1) is the value which was previously stored in the register RI3 and is added to the output value of the multiplier MI1 in the adder AI3. The factors of the said multiplier are the factor TIx, on the one hand, and also the sum U(n) and U(n-1) of the values of the registers RI1 and RI2. The content of the register RI3 is inverted by the inverter NI1 and fed to the adder AI1, at whose other input the digitized output signal HF' is present. The inertia or the reaction speed of the integrator 15 is altered by way of the variation of the factor TIx.

On account of the different lengths of the data markings, which extend from 3T to 14T, and thus different lengths of half-cycles of the output signal HF, integration times of different lengths occur for successive positive or negative values of the output signal HF. This means that fluctuations are produced in the integrated signal HFI, which are smoothed out by the low-pass filter 16. The error in the average value M and thus in the output value of the data slicer 5 is thus reduced. The low-pass filter 16 has a divider TT1, which divides its input signal by eight, nine registers RT1 to RT9, eight of which are connected in series, an inverter NT1 and two adders AT1, AT2.

The comparator 7 of the control unit 14 is depicted in the right-hand part thereof, which comparator has three comparators 71, 72, 73 and two AND gates A1, A2. The average value M is compared with the first threshold value S1 in the first comparator 71. If the average value lies above the threshold value S1, than a signal is output to an AND gate A3, otherwise to the AND gate A1. The average value M is compared with the second threshold value S2 in the comparator 72; if it lies above the said threshold value, a signal is output to the AND gate A1, otherwise to the AND gate A2. The average value M is compared with the third threshold value S3 in the third comparator 73; if it lies above the said threshold value, then a signal is output to the AND gate A2, otherwise to an AND gate A6. The comparators 71 to 73 take the threshold values S1 to S3 from a unit 8. The output signal of the AND gate A1 is fed to an AND gate A4, and that of the AND gate A2 is fed to an AND gate A5. The AND gates A3 to A6 are parts of the time constant generator 9, which is furthermore assigned an OR gate O1 and four memory elements M1 to M4. The factors TI1, TI2, TI3 and TI4 are stored in the memory elements M1 to M4. Depending on the range of values in which the average value M is situated, one of the AND gates A3 to A6 opens and the corresponding factor TIx is fed to the integrator 15 via the OR gate O1.

Figure 6:
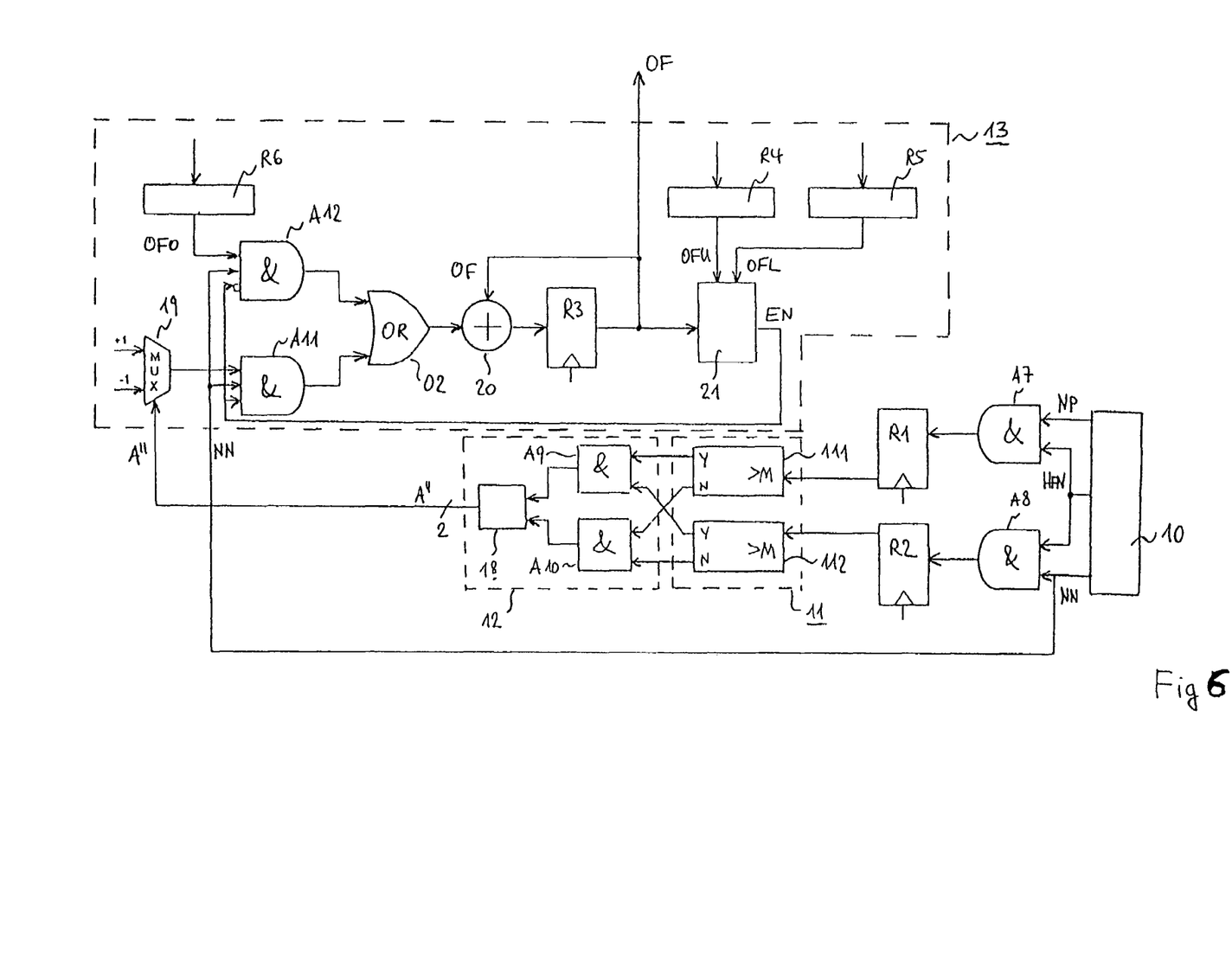
FIG. 6 shows an offset value generator of a device according to the invention.

FIG. 6 shows an offset value generator 13 and groups of a device according to the invention which are connected with the said generator. The offset value generator 13 outputs the offset value OF to the adder 17 of FIG. 5. The input signal of the offset value generator 13 is the trigger signal A", which is output by the repeat check unit 12. A further input signal of the offset value generator 13 is a signal NN, which indicates a negative zero crossing. The signal NN is output by the extrapolation unit 10 if a negative extrapolated zero crossing is present, that is to say a falling edge. In the event of a positive zero crossing, a rising edge, the extrapolation unit 10 outputs a signal NP. The signals NP and NN enable AND gates A7, A8, via which the value HFN of the output signal at the zero crossing is written to a register R1 and R2, respectively. The presence of two registers R1, R2 makes it possible for the repeat check unit 12 subsequently to ascertain whether two successive values have the same sign. In this respect, the registers R1, R2 and the AND gates A7, A8 may already be regarded as elements which are at least partly assigned to the repeat check unit 12. The output signals of the registers R1, R2 are fed to comparator elements 111, 112 of the comparator 11. In the comparator 111, 112, the respective input signal present, which corresponds to the value HFN of the output signal at the zero crossing, is compared with the average value M. If the value HFN is greater than the average value M, then an output Y is set, otherwise an output N. The outputs of the comparator elements 111, 112 are connected to AND gates A9, A10 of the repeat check unit 12 in such a way that the AND gate A9 is set if the Y output of both comparison elements 111, 112 is set and the output of the AND gate 10 is set if the N outputs of both comparison elements 111, 112 are set. The output of the AND gate 10 and the output of the AND gate 9 are fed to a combiner 18, which, by way of example, outputs a two-bit trigger signal A" whose first bit corresponds to the state of the AND gate A9 and whose second bit corresponds to the state of the AND gate A10. In the offset value generator 13, a multiplexer 19 outputs a positive value, in this case +1, if A" assumes the binary value '10', and it outputs a negative value, in this case −1 if A" assumes the binary value '01'. The output value of the multiplexer 19 is fed to an AND gate A11, which is enabled when a signal NN is present, on the one hand, and an enable signal EN, on the other. The output value of the multiplexer 19 is in this case fed to an adder 20 via a further OR gate O2. The offset value OF is present at the other input of the adder 20, which offset value, depending on the output signal of the multiplexer 19, is increased, decreased or kept constant and stored in a register R3.

The offset value OF is furthermore fed to a comparator 21, which compares the offset value OF with an upper permissible offset value OFU of a register R4 and a lower permissible offset value OFL of a register R5. If the offset value OF lies between the upper and lower permissible offset values OFU, OFL, then the enable signal EN is set, otherwise it is zero. This prevents an excessively large offset value OF from being formed. The upper and lower limit values OFU and OFL are chosen such that expedient offset values that usually occur are permissible, whereas other offset values that are usually based on a malfunction are not accepted. In such a case, the enable signal enables the AND gate A12, which then outputs a standard offset value OFO from a register R6 given the presence of the signal NN. At the same time, care is taken to ensure, this not being illustrated here, that the register R3 is reset before the addition in the adder 20 is carried out, with the result that the standard offset value OFO is actually written to the register R3 during the next clock cycle. A plurality of clock cycles are usually required until the offset value OF is corrected to such an extent that it remains constant. Depending on the desired setting speed, the values output by the multiplexer 19 may be chosen with larger or smaller gradation.

What is claimed is:

1. Device for reading from or writing to optical recording media (1) having an optical scanner (2) for scanning the recording medium (1) by means of a light beam (3) and for generating scanning signals (HF) from the reflected beam (3), a data slicer (5) for converting a scanning signal (HF) output by the optical scanner (2) into a binary signal (HF"), an averaging unit (6) for forming an average value (M) from the scanning signal (HF, HF"), the average value (M) being used as a second input signal of the data slicer (5), and a control unit (14) for changing a parameter (T, OF) of the averaging unit (6), characterized in that the control unit (14) has a unit (8, 10) for outputting a comparison value (S, HFN) and a comparator (7, 11) comparing the average value (M) with said comparison value (S, HFN), and triggers a change in the parameter (T, OF) in the event of the comparison value being exceeded or undershot.

2. Device according to claim 1, characterized in that a threshold value (S) is fixedly predetermined as the comparison value and a time constant (T) of the averaging unit (6) is changed as the parameter.

3. Device according to claim 2, characterized in that the unit for outputting a comparison value is an extrapolation unit (11) for determining an extrapolated zero crossing (t1-t5) of the scanning signal (HF) and, as the comparison value, outputs the value (HFN) of the scanning signal at the extrapolated zero crossing (t1-t5), and the comparator (11) triggers a change in an offset value (OF) for the averaging unit (6) if there is a difference between comparison value (HFN) and average value (M).

4. Device according to claim 2, characterized in that a repeat check unit (12) is arranged downstream of the comparator (7, 11), which outputs a corresponding output signal (A") only in the event of multiply successive unidirectional input signals (A, A').

5. Device according to claim 1, characterized in that the unit for outputting a comparison value is an extrapolation unit (11) for determining an extrapolated zero crossing (t1-t5) of the scanning signal (HF) and, as the comparison value, outputs the value (HFN) of the scanning signal at the extrapolated zero crossing (t1-t5), and the comparator (11) triggers a change in an offset value (OF) for the averaging unit (6) if there is a difference between comparison value HFN) and average value (M).

6. Device according to claim 1, characterized in that a repeat check unit (12) is arranged downstream of the comparator (7, 11), which outputs a corresponding output signal (A") only in the event of multiply successive unidirectional input signals (A, A').

7. Device according to claim 1, characterized in that an analogue-to-digital converter (4) is arranged downstream of the optical scanner (2).

* * * * *